United States Patent [19]

Raad et al.

[11] Patent Number: 5,696,678
[45] Date of Patent: Dec. 9, 1997

[54] METHOD FOR PREVENTING UNDESIRABLE LOWERING OF AN AIR SUSPENSION SYSTEM

[75] Inventors: Joseph M. Raad, Southgate; Steven J. Reimers, Allen Park; Ray Andrew Sackett, Monroe; Ronald J. Collins, Dearborn, all of Mich.

[73] Assignee: Ford Global Technologies, Inc., Dearborn, Mich.

[21] Appl. No.: 574,484

[22] Filed: Dec. 19, 1995

[51] Int. Cl.$^6$ .................... B60G 17/015; B60G 17/052
[52] U.S. Cl. ................. 364/424.046; 364/424.048; 280/707
[58] Field of Search .................. 364/424.045, 424.046, 364/424.048; 280/688, 707, 711

[56] References Cited

U.S. PATENT DOCUMENTS

| | | | |
|---|---|---|---|
| 4,621,833 | 11/1986 | Soltis | 280/707 |
| 4,965,878 | 10/1990 | Yamagiwa et al. | 364/424.05 |
| 5,286,059 | 2/1994 | Tabe | 280/840 |
| 5,452,919 | 9/1995 | Hoyle et al. | 280/840 |

*Primary Examiner*—Michael Zanelli
*Attorney, Agent, or Firm*—Gregory P. Brown, Esq.; Roger L. May, Esq.

[57] ABSTRACT

A method for preventing undesirable lowering of an air suspension system for a motor vehicle includes the steps of sensing vehicle speed of the motor vehicle, determining whether the sensed vehicle speed is equal to a predetermined speed, venting air from the air suspension system to lower a vehicle body of the motor vehicle if the sensed vehicle speed is equal to the predetermined speed, sensing height of corners of the vehicle body, calculating a height rate for the corners of the vehicle body based on the sensed height, determining whether a height rate of a corner of the vehicle body is greater than a predetermined rate, and disabling or halting venting of the air suspension system if the height rate of a corner of the vehicle body is greater than the predetermined rate.

8 Claims, 1 Drawing Sheet

METHOD FOR PREVENTING UNDESIRABLE LOWERING OF AN AIR SUSPENSION SYSTEM

BACKGROUND OF THE INVENTION

1. Field of the Invention

The present invention relates generally to air suspensions for vehicles and, more specifically, to a method for preventing undesirable lowering of an air suspension system for a motor vehicle.

2. Description of the Related Art

It is known to provide an air suspension system for a motor vehicle such as an automotive vehicle to keep the vehicle body at the same ride height regardless of loading. When the vehicle is parked (speed=0 m.p.h.) and unloaded, air springs of the air suspension system are normally vented such that the ride height of the vehicle body is lowered back to nominal. If the vehicle body is obstructed from lowering by a high curb or snowbank, the air suspension system will continue to vent air from the air springs until the vehicle body becomes stuck on the obstruction as the weight of the vehicle body is transferred from the wheels to the obstruction. However, if sufficient weight remains on the driven wheels such that some traction is maintained, the vehicle body will abruptly fall down to the jounce stops as the vehicle is driven off the obstruction. Thus, there is a need in the art to prevent undesirable lowering of an air suspension system under certain situations such as a high curb or snowbank, hoisting, or jacking situation.

SUMMARY OF THE INVENTION

Accordingly, the present invention is a method for preventing undesirable lowering of an air suspension system for a motor vehicle. The method includes the steps of sensing vehicle speed of the motor vehicle and determining whether the sensed vehicle speed is equal to a predetermined speed. The method also includes the steps of venting air from the air suspension system to lower a vehicle body of the motor vehicle if the sensed vehicle speed is equal to the predetermined speed. The method includes the steps of sensing height of corners of the vehicle body and calculating a height rate for the corners of the vehicle body based on the sensed height. The method includes the steps of determining whether a height rate of a corner of the vehicle body is greater than a predetermined rate and disabling or halting venting of the air suspension system if the height rate of a corner of the vehicle body is greater than the predetermined rate.

One advantage of the present invention is that a method is provided to prevent undesirable lowering of an air suspension system for an automotive vehicle. Another advantage of the present invention is that the method has the ability to detect undesirable lowering of an air suspension system and react appropriately based on the nature of the situation. Yet another advantage of the present invention is that the method, in a high curb or snowbank situation, hoisting situation, or jacking situation, prevents the air suspension system from lowering the vehicle body. Still another advantage of the present invention is that the method allows for better event identification of the situation and response of the air suspension system.

Other features and advantages of the present invention will be readily appreciated as the same becomes better understood after reading the subsequent description taken in conjunction with the accompany drawings.

DESCRIPTION OF THE PREFERRED EMBODIMENT(S)

Figure 1:
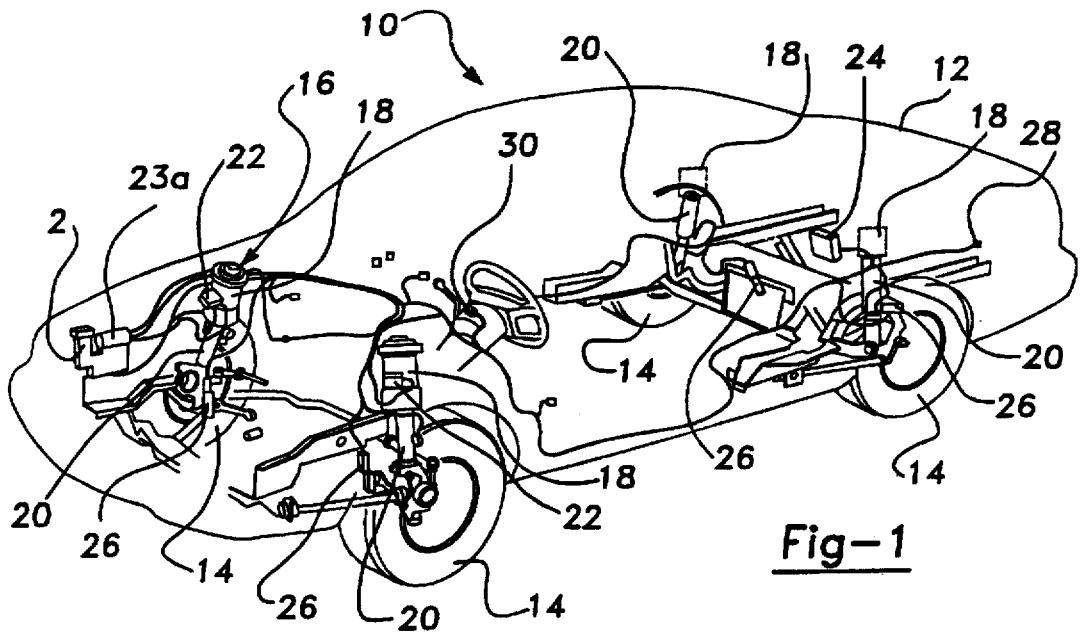
FIG. 1 is a perspective view of a motor vehicle employing a method, according to the present invention, for preventing undesirable lowering of an air suspension system partially illustrated for the motor vehicle.

Referring to FIG. 1, one embodiment of a motor vehicle 10 such as an automotive vehicle is partially shown. The motor vehicle 10 includes a vehicle body 12, a plurality of wheels 14 and an air suspension system, generally indicated at 16, for supporting the vehicle body 12 upon the wheels 14. It should be appreciated that the air suspension system 16 keeps the vehicle body 12 at the same ride height regardless of loading.

The air suspension system 16 includes adjustable front and rear air springs 18 cooperating with semi-active dampers 20 and disposed between the vehicle body 12 and the wheels 14. The air suspension system 16 also includes an air spring solenoid 22 for each air spring 18 and an air compressor 23 fluidly connected to each of the air spring solenoids 22. The air compressor 23 includes a vent solenoid 23a fluidly connected to each of the air springs 18. It should be appreciated that the air suspension system 16 is conventional and known in the art.

The air suspension system 16 further includes an electronic control unit 24 electrically connected to each air spring solenoid 22, the air compressor 23 and vent solenoid 23a. The air suspension system 16 includes a height sensor 26 associated with each wheel 14 and electrically connected to the electronic control unit 24 to sense the height of the vehicle body 12 relative to the wheel 14. Each height sensor 26 senses lowering or rising of a corner of the vehicle body 12 relative to the wheel 14. The air suspension system 16 also includes an air leveling disable or inhibit switch 28 electrically connected to the electronic control unit 24 for disabling or turning OFF the air suspension system 16 and an ignition switch 30 electrically connected to the electronic control unit 24 for starting the motor vehicle 10.

The electronic control unit 24 receives inputs from the height sensors 26, disable switch 28, an ignition switch 30 and other sensors (not shown). In return, the electronic control unit 24 outputs commands to each air spring solenoid 22 for allowing air from the air compressor 24 to the air springs 18 and to the vent solenoid 23a for venting air from the air springs 18. The electronic control unit 24 also calculates height rate based on input from the height sensors 26 over time. Those skilled in the art will appreciate in view of this disclosure that the processor within the electronic control unit 24 and its associated peripheral equipment could be structured according to several different architectures. In this embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data is being processed. It should be appreciated that the electronic control unit 24, height sensors 26, and switches 28 and 30 are conventional and known in the art.

Figure 2:
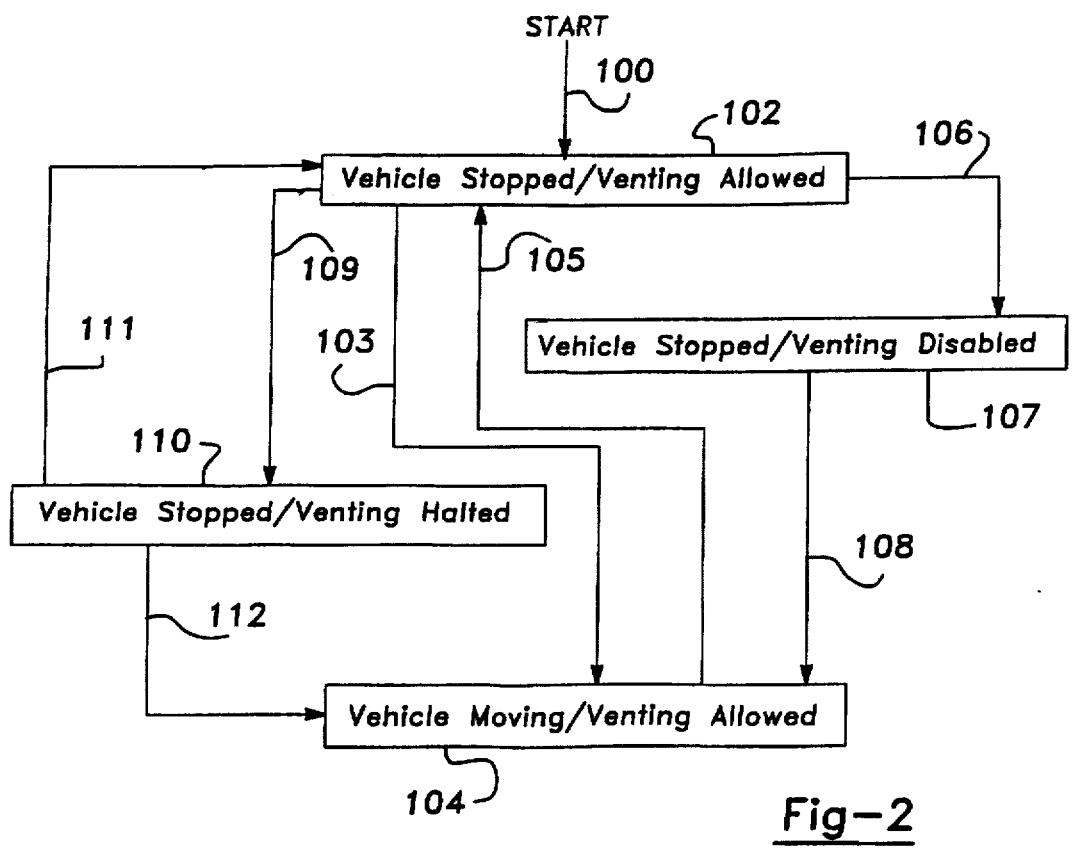
FIG. 2 is a state diagram of a method, according to the present invention, for preventing undesirable lowering of the air suspension system for the motor vehicle of FIG. 1.

Referring to FIG. 2, a state diagram of a method, according to the present invention, for preventing undesirable lowering of the air suspension system 16 for the motor vehicle 10 is shown. The method begins or starts upon start-up or power-up of the vehicle 10. The electronic control unit 24 receives an input signal from the ignition switch 30. At power-up, the method is in state 102 and determines if the motor vehicle 10 is stopped. For example, the electronic control unit 24 reads a signal from a vehicle speed sensor (not shown). The method senses the vehicle speed of the motor vehicle 10 and determines whether the vehicle speed of the motor vehicle 10 is less than or equal to a predetermined speed such as zero miles per hours (0 m.p.h.) stored in the electronic control unit 24. If the vehicle speed is less than or equal to the predetermined speed, the method determines that the vehicle is stopped and allows venting of the air springs 18. It should be appreciated that the electronic control unit 24 outputs commands to the vent solenoid 23a to vent air from the air springs 18 to lower the vehicle body 12 of the motor vehicle 10 relative to the wheels 14.

If the vehicle speed is greater than the predetermined speed, the method advances along transition line 103 to state 104 and clears predefined timers in the electronic control unit 24. In state 104, the method determines that the motor vehicle 10 is moving and allows venting of the air springs 18 as previously described. If the vehicle speed returns to the predetermined value, the method advances along transition line 105 back to state 102 and clears predefined timers in the electronic control unit 24.

In state 102, the method is venting the air springs 18. While venting, the method monitors the lowering of the vehicle body 12 and detects when a rate of lowering falls below a predetermined rate before nominal is achieved. The electronic control unit 24 calculates the rate of lowering as previously described and compares this rate to the predetermined rate stored in memory. In state 102, with the motor vehicle 10 stopped, the method determines whether venting of an air spring 18 for a corner of the vehicle body 12 to lower the corner of the vehicle body 12 has occurred at a rate greater than a predetermined rate such as −1 mm/sec for a predetermined time such as ten (10) seconds. If the electronic control unit 24 detects a rate of lowering which is greater than the predetermined rate of −1 mm/sec, the method advances along transition line 106 to state 107 and disables venting of the air springs 18. The method also clears predefined timers in the electronic control unit 24. It should be appreciated that the electronic control unit 24 turns OFF the vent solenoid 23a, thereby preventing venting of the air springs 18.

In state 107, with the motor vehicle 10 stopped, the venting of the air springs 18 and lowering of the vehicle body 12 is disabled. The method monitors the vehicle speed. If the vehicle speed exceeds a predetermined speed such as fifteen miles per hour (15 m.p.h.) for a predetermined time such as seven (7) seconds, the method advances along transition line 108 to state 104 and enables venting of the air springs 18. The electronic control unit 24 monitors vehicle speed and compares the vehicle speed to a predetermined speed stored in memory. It should be appreciated that the electronic control unit 24 will vent any of the air springs 18 based on the signal from the height sensors 26. It should also be appreciated that the electronic control unit 24 will stop venting of the air springs 18 when the vehicle body 12 reaches a predetermined nominal height relative to the wheels 14.

In state 102, while venting with the vehicle 10 stopped, the method determines whether any corner of the vehicle body 12 is rising relative to its wheel 14. If the electronic control unit 24 detects a rate of rising of a corner of the vehicle body 12 at a rate greater than a predetermined rate such as two millimeters per second (2 mm/sec), the method advances along transition line 109 to state 110 and halts or suspends venting of the air springs 18. The method clears predefined timers in the electronic control unit 24. It should be appreciated that the timers are reset to prevent lockouts induced from unloading the motor vehicle 10.

In state 110, with the vehicle stopped, the method determines whether no corner of the vehicle body 14 is rising for a predetermined time such as three seconds. If the electronic control unit 24 detects no corner rising based on the signal from the height sensors 26 and vehicle speed is equal to zero, the method advances along transition line 111 to state 102 and resumes venting of the air springs 18.

In state 108, with the vehicle stopped, the method monitors vehicle speed. If the electronic control unit 24 detects vehicle speed above a predetermined speed such as zero, the method advances along transition line 112 to state 104 and resumes venting.

In a high curb or snowbank situation, the method will lower the vehicle body 12 until the obstruction is encountered and continue to vent air from the air springs 18 only a short time thereafter. When the motor vehicle 10 is subsequently moved, it will emulate a steel spring vehicle as it drives off the obstruction, dropping gently to a position above full jounce such that the driver is unaware that the event has occurred.

In a hoisting situation, the method will detect that the wheels 14 are not coming out of rebound and suspend further venting. When the hoist is lowered, the vehicle ride height will again be somewhere above full jounce with air remaining in the air springs 18.

In a jacking situation of the vehicle 10, if the switch 28 is not turned OFF, the method would attempt to lower the vehicle body 12 slightly and suspend further air suspension action until the vehicle speed exceeded fifteen miles per hour, thus preventing the vehicle from shifting on the jack.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for preventing undesirable lowering of an air suspension system for a motor vehicle, said method comprising the steps of:

sensing vehicle speed of the motor vehicle;

determining whether the sensed vehicle speed is equal to a predetermined speed;

venting air from the air suspension system to lower a vehicle body of the motor vehicle if the sensed vehicle speed is equal to the predetermined speed;

sensing height of corners of the vehicle body;

calculating a height rate for the corners of the vehicle body based on the sensed height;

determining whether a height rate of a corner of the vehicle body is greater than a predetermined rate; and disabling or halting venting of the air suspension system if the height rate of a corner of the vehicle body is greater than the predetermined rate.

2. A method as set forth in claim 1 including the step of determining whether the sensed vehicle speed is greater than a second predetermined speed for a second predetermined time.

3. A method as set forth in claim 2 including the step of venting air from the air suspension system to lower the vehicle body if the sensed vehicle speed is greater than the second predetermined speed for the second predetermined time.

4. A method as set forth in claim 1 including the step of determining whether no corner of the vehicle body is rising for a third predetermined time.

5. A method as set forth in claim 4 including the step of resuming venting of the air suspension system if no corner of the vehicle body is rising for the third predetermined time.

6. A method as set forth in claim 1 including the step of determining whether the sensed vehicle speed is greater than the predetermined speed.

7. A method as set forth in claim 6 including the step of resuming venting of the air suspension system if the sensed vehicle speed is greater than the predetermined speed.

8. A method as set forth in claim 1 including the step of venting air from the air suspension system to lower the vehicle body if the sensed vehicle speed is not equal to the predetermined speed.

* * * * *